Patented Apr. 17, 1945

2,373,658

UNITED STATES PATENT OFFICE

2,373,658

PREPARATION OF NEW SULPHONAMIDE DERIVATIVES

Gordon Cecil Butler, Montreal, Quebec, Ezra Lozinski, Westmount, Quebec, and Arthur Duston Odell, Montreal, Quebec, Canada, assignors to Charles E. Frosst & Co., Montreal, Quebec, Canada No Drawing. Application January 12, 1942, Serial No. 426,470

2 Claims. (Cl. 260—397.7)

This invention relates to sulphonamide derivatives and has for its object the preparation of new therapeutically useful para-amino-benzene sulphonamide derivatives of substituted naphthols by reacting para-acylaminobenzenesulphonyl chlorides with the amino group of 4-amino-1-naphthols containing an organic substituent attached to the nucleus at position 2.

The new compounds contemplated by this invention are prepared by reacting para-acylaminobenzenesulphonyl chlorides with the requisite amino-naphthalene derivatives followed by hydrolysis of the acyl group.

The invention is further illustrated by the following examples of procedures which may be followed in the preparation of N-(para-amino-benzene-sulphonylyl) - 2 - allyl - 4 - amino - 1 - naphthol, and N-(para-amino-benzene-sulphonylyl)-1-hydroxy-4-amino-2-naphthoic acid. It is to be understood, however, that the invention is not limited to the exact details given in these examples:

Example 1

50 grams of 2-allyl-4-amino-1-naphthol hydrochloride (Formula I) (prepared according to Fieser, Campbell and Fry, J. A. C. S. 61, 2213, 1939) are dissolved in one litre of water by bringing the water to boiling temperature.

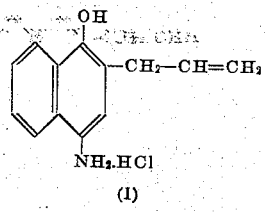

(I)

60 grams of sodium acetate (3H₂O) are then added to the solution to precipitate free amine, the reactions involved being substantially as represented by the following equation:

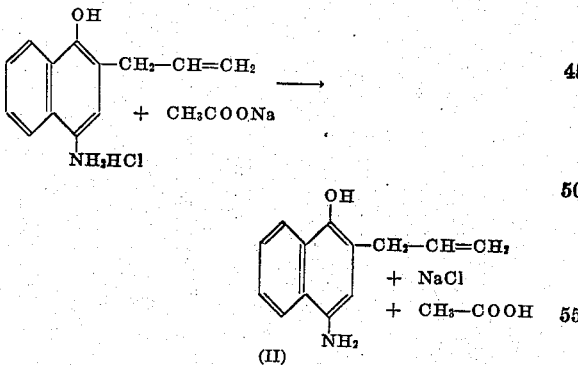

The amine (Formula II) is re-dissolved by the addition of 700 cc. of 1.4-dioxane and 49 grams of p-acetamino-benzene-sulphonyl chloride (Formula III) are then added during a five minute period with continual stirring. Stirring is continued for a further fifteen minute period, during which time a large amount of crystalline product separates from the reaction mixture. This procedure, as represented by the following reaction, is preferably carried out in an atmosphere of nitrogen

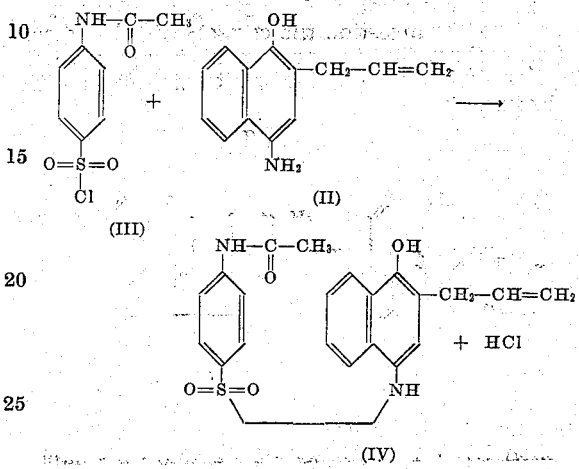

The solution is cooled and the crystals are then filtered off and washed thoroughly on the filter with alcohol. By this procedure there results N-(para - acetamino - benzene - sulphonylyl) - 2-allyl-4-amino-1-naphthol (Formula IV), which melts at 240° C. with decomposition.

In order to achieve the hydrolysis of the acetyl group of this compound (Formula IV), 60 grams of it are refluxed for two hours with four litres of alcohol and 300 cc. of concentrated aqueous hydrochloric acid, as represented by the following reaction:

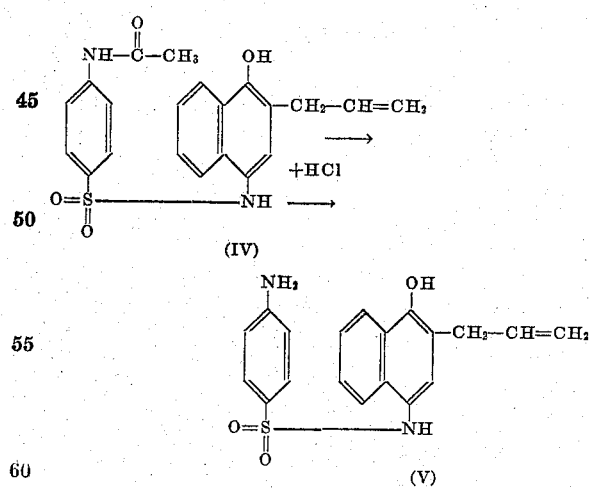

When the alcohol is removed by distillation and the residue is crystallized from 50% aqueous alcohol there is obtained a product which, on further recrystallization from 50% aqueous alcohol yields N - (para - amino - benzene - sulphonylyl) - 2-allyl-4-amino-1-naphthol (V). This compound melts with decomposition at 195° C.

*Example 2*

10 grams of 1-hydroxy-4-amino-2-naphthoic acid (VI) is dissolved in 1 litre of water containing 4.15 grams of sodium bicarbonate. After solution has been effected 6.7 grams of sodium acetate (3H₂O) are added followed by 500 cc. dioxane. 11.5 grams p-acetamino benzene sulphonyl chloride (III) are added in small portions to the above solution over 15 minutes with continuous stirring and warming to 50° C. Stirring is continued another 15 minutes to complete the reaction; the solution is then cooled and made slightly acid by the addition of hydrochloric acid when the N-(para-acetamino-benzene-sulphonylyl)-1-hydroxy-4-amino-2-naphthoic acid (VII) separates in the form of fine needles. This is filtered off and washed thoroughly on the filter with water and alcohol. Further purification is achieved by digesting the crystals with hot alcohol, cooling, filtering and washing with alcohol. After drying, the product melts at 240° C. with decomposition.

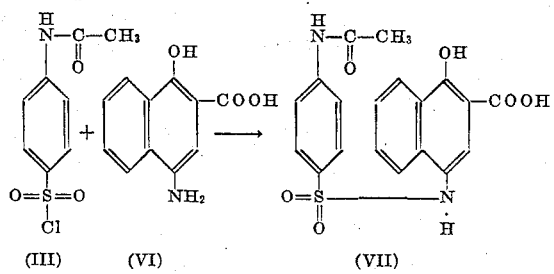

(III)  (VI)  (VII)

For hydrolysis of the acetyl group 20 grams of the N-(para-acetamino-benzene-sulphonylyl) - 1 - hydroxy - 4 - amino - 2 - naphthoic acid (VII) are refluxed with 2 litres alcohol and 100 cc. concentrated hydrochloric acid. After 2 hours refluxing, charcoal is added to the solution, boiling continued for 5 minutes and the solution is filtered hot. The filtrate is reduced to about one-quarter of its original volume and chilled. The N - (para - amino - benzene - sulphonylyl) - 1 - hydroxy - 4 - amino-2 - naphthoic acid hydrochloride (VIII) separates as colourless needles which are filtered off and washed with alcohol. After drying the crystals do not melt but decompose slowly between 240 and 250° C. The free amine prepared from the above hydrochloride (VIII) after crystallisation from alcohol, melts at 225° C. with decomposition.

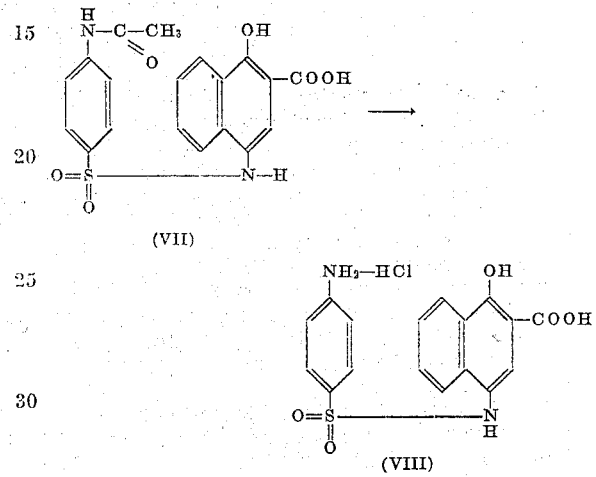

Having thus described our invention, what we claim is:

1. A process for the preparation of N-(para-amino - benzene - sulphonylyl) - 2 - allyl - 4 - amino-1-naphthol by the interaction of para-acetamino-benzene-sulphonyl chloride and 2-allyl-4-amino-1-naphthol followed by hydrolysis of the acylamino group in the resultant product.

2. The new compound N-(para-amino-benzene - sulphonylyl) - 2 - allyl - 4 - amino - 1-naphthol.

GORDON CECIL BUTLER.
EZRA LOZINSKI.
ARTHUR DUSTON ODELL.